May 17, 1955
H. S. WINNICKI
2,708,620
PRODUCTION OF PHOSPHORIC ACID
Filed April 12, 1951
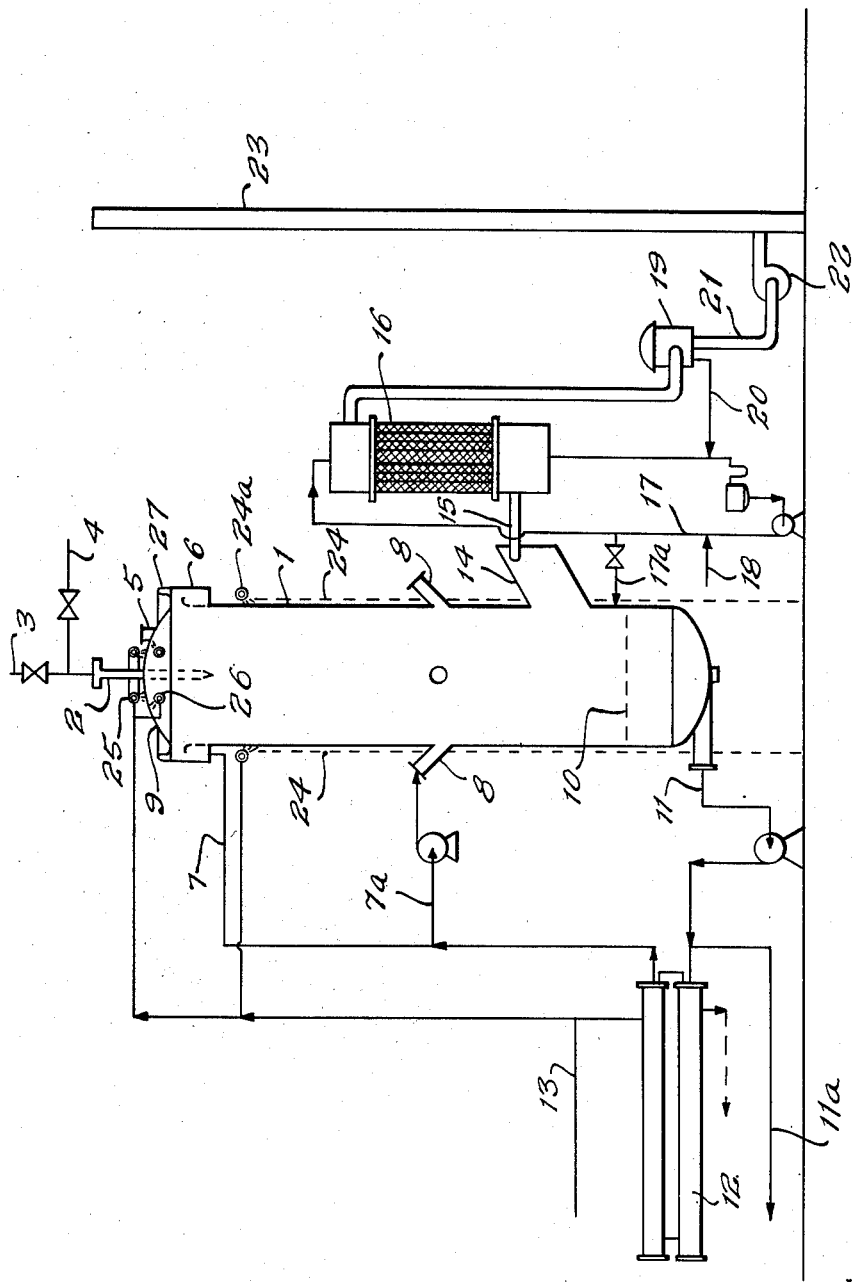
INVENTOR.
HENRY S. WINNICKI
BY
Pollard & Johnston
ATTORNEYS United States Patent Office 2,708,620
Patented May 17, 1955

2,708,620

PRODUCTION OF PHOSPHORIC ACID

Henry S. Winnicki, White Plains, N. Y., assignor to Food Machinery and Chemical Corporation, New York, N. Y., a corporation of Delaware Application April 12, 1951, Serial No. 220,594

5 Claims. (Cl. 23—165)

This invention relates to a method and apparatus for the production of phosphoric acid from elemental phosphorus.

Various methods of producing phosphoric acid from elemental phosphorus have been described, as for example in Chemical Engineering Report No. 2, "Development of Process and Equipment for the Production of Phosphoric Acid," Tennessee Valley Authority, Wilson Dam, Alabama (1948).

In burning phosphorus to form phosphorus pentoxide, a large amount of heat is generated and additional heat is generated when the phosphorus pentoxide is reacted with water to form phosphoric acid. As the hot gases and the hot phosphoric acid are corrosive, one method commonly used to produce phosphoric acid from elemental phosphorus comprises burning elemental phosphorus in the top of a graphite walled chamber constructed as described in United States Patent No. 2,532,322, flowing water down the outer walls of the graphite walled chamber to cool the walls and maintain the inner surface of the graphite below the temperature at which it will oxidize, passing the hot combustion gases out of the graphite walled chamber, cooling the gases in a graphite cooling chamber containing a large number of graphite tubes through which water is circulated and passing the cooled gases into a hydrator and absorbing phosphorus pentoxide from the cooled gases in flowing water or flowing phosphoric acid sprayed into the hydrator and flowing countercurrent to the cooled gases. The gases not absorbed in the hydrator are passed to an electrostatic precipitator where the remaining phosphoric acid is precipitated out of the gases. Such a process is described in greater detail on pages 75 to 87 of the said Chemical Engineering Report No. 2.

Various attempts have been made to absorb the phosphorus pentoxide in recirculated phosphoric acid in the combustion chamber in which the phosphorus is burned such as described, for example, on pages 99 to 106 of the said Chemical Engineering Report No. 2 and in the German process described on pages 40 and 41 of Final Report No. 562 of the British Intelligence Objectives Sub-Committee entitled "The German Phosphorus Industry at Bitterfield and Piesteritz." These attempts to produce phosphoric acid by absorption of phosphorus pentoxide in water or recirculated phosphoric acid in the combustion chamber in which the phosphorus is burned have not been satisfactory for various reasons. Where refractory lined chambers are used, the phosphoric acid is often contaminated by materials absorbed from the refractory linings, extensive cooling of the recirculated acid is necessary, and where attempts have been made to use unlined metal walled towers, serious corrosion and cooling problems have been encountered.

It is the object of this invention to provide an economical method and apparatus in which elemental phosphorus may be burned to phosphorus pentoxide in a suitable combustion tower and the phosphorus pentoxide absorbed and converted to phosphoric acid in a film of concentrated phosphoric acid circulating on the inside walls of the combustion tower while the outside of the tower is cooled by flowing water which keeps the walls of the tower cool without diluting the strength of the acid formed and in which the combustion tower may be made of stainless steel or other corrosion resistant metals or alloys and maintained at a sufficiently low temperature to prevent corrosion of the walls of the tower.

Another object of this invention is to provide a process and apparatus for phosphoric acid production in which the combustion tower is cooled and phosphorus pentoxide absorbed in a flowing film of phosphoric acid on the inside walls of the tower while the outside of the tower is cooled by a film of water flowing outside the tower and in which the inside and outside cooling is so correlated to permit the production of commercial concentrations of phosphoric acid—75% or higher—in an unlined metal walled tower without permitting the walls of the tower to reach a temperature at which serious corrosion of stainless steel by the phosphoric acid takes place.

Various other objects and advantages of my invention will appear as this description proceeds.

Referring now to the drawings which illustrate a preferred form of embodiment of apparatus and a preferred method of practicing the process of my invention:

A combustion furnace for the burning of elemental phosphorus to phosphorus pentoxide is illustrated at 1 and consists preferably of a vertical stainless steel tower (AISI type 316 stainless steel) having a phosphorus burner 2 adjacent the top thereof which receives phosphorus from line 3 and air for atomizing molten phosphorus from the line 4. Sufficient air for complete combustion of the phosphorus enters the top of the tower through suitable openings 5. A phosphorus burner of this general type is described in greater detail in Chemical Engineering, vol. 55, No. 10, page 105, October 1948.

The dome 9 of the tower 1 is cooled by water sprayed from the ring 25 connected to the cooling water line 13 and the inside of the tower dome is cooled by water from the ring 26 sprayed against the underside of the dome. A dam 27 around the outer edge of the dome 9 maintains a pool of water at the outer edge of the dome at all times.

Surrounding the top open end of the tower 1 below the dome thereof is a launder 6 forming a reservoir into which recirculating phosphoric acid may be pumped from the line 7 and suitable weirs indicated in dotted lines inside the launder 6 insure uniform distribution of the acid along the walls of the tower 1. Additional recirculating acid may be sprayed into the tower from the line 7a through spaced spray nozzles 8 located in one or more positions along the walls of the tower 1. The nozzles 8 may be in one or two tiers and are preferably uniformly spaced around the tower. The phosphoric acid overflows the weirs, indicated in dotted lines around the top of the tower 1 inside the launder 6, and flows down and covers the walls of the tower 1 from top to bottom thereof. Additional spray inlets 8 permit additional phosphoric acid to be introduced along the walls of the tower as needed to keep the walls uniformly wetted and provide sufficient acid to absorb the phosphorus pentoxide.

If desired water may be sprayed into the tower through some of the inlets 8 and additional water sprays may be located in the dome 9 of the tower. The phosphoric acid flowing along the walls of the tower absorbs phosphorus pentoxide and water is vaporized from the water sprayed into the tower and from the phosphoric acid along the walls of the tower which assists in the hydration and absorption of the phosphorus pentoxide vapors in the phosphoric acid solution flowing along the walls of the tower.

A level of liquid is maintained approximately at the dotted line position indicated as 10 in the bottom of the tower so as to maintain a suitable pool or reservoir of phosphoric acid for recirculation through the tower. Such a pool protects the bottom of the tower 1 from contact with the combustion gases and increases the absorption of phosphorus pentoxide therein. It will be understood, however, the reservoir of phosphoric acid for recirculation through the tower can be maintained in tanks outside the tower instead of in a pool inside the base of the tower.

The flow of acid through the tower is preferably so regulated that phosphoric acid is withdrawn from the bottom of the tower 1 through the line 11 at a temperature of approximately 70° C. and a concentration of approximately 75% $H_3PO_4$. A portion of the withdrawn acid is passed to storage through line 11a and the remainder of the acid flows to the heat exchangers 12 from which it emerges at a temperature of approximately 55° C. and is pumped back through the line 7 to launder 6.

The outside of the tower 1 is cooled by a film of cooling water 24 which is sprayed around the top of the tower 1 from the ring 24a connected to the cooling water line 13. The cooling water from the line 13 is preferably at a temperature of approximately 25° C. and after flowing down the walls of the tower is discharged to the sewer or to storage reservoirs at a temperature of approximately 60° C.

Under certain conditions of operation cooling in the heat exchangers 12 may become unnecessary. The rate at which phosphorus is burned in the tower 1 might, if desired, be reduced to the point that all the heat generated can be removed by the water flowing over the outside walls of the tower, and the acid flowing along the inside of the tower without outside cooling of the acid. This might require increasing the concentration of the acid to perhaps 85% to reduce its corrosiveness at the higher temperature. Such changes in operation are considered to be within the scope of my invention.

The steam, uncondensed gases and unabsorbed phosphorus pentoxide are withdrawn from a level near to but above the base of the tower 1 through the outlet 14, which is located above the liquid level 10 and preferably slopes upwardly as indicated, and passed through the line 15 to a packed tower 16 or an electrostatic precipitator, scrubber or other means for the removal of mist from a gas stream. In the scrubber 16 the gases may be contacted with recirculating phosphoric acid from the line 17 or water from the line 18 to absorb any remaining phosphorus pentoxide and scrub out the remaining phosphoric acid. Sufficient liquid may be added through line 17a to maintain the desired acid strength in the tower 1 by flow of dilute phosphoric acid through the branch line 17a into the bottom of the tower. In the tower 16 the remainder of the phosphorus pentoxide is precipitated and recovered in the liquid flowing through the line 17 and the tower 16. The uncondensed gases, after passing through the tower 16, are at a temperature of approximately 50° C. The moisture remaining in the gases, consisting largely of dilute phosphoric acid droplets, may be separated in the moisture separator 19 and returned to the line 17 through the line 20. The unabsorbed gases then pass through the line 21 to the suction fan 22 and are discharged to the atmosphere through the stack 23. A slightly negative pressure is maintained at the top of the tower 1 and suction fan 22 is operated to maintain a sufficient vacuum at the bottom of the tower to withdraw the steam and gases from the outlet 14.

By simultaneously flowing water down the outside walls of the tower 1 and flowing phosphoric acid along the inside walls of the tower, it is possible to maintain the walls of the tower below the temperature at which stainless steel is corroded by phosphoric acid. When operating the process to produce 75% phosphoric acid, it is desirable to withdraw phosphoric acid at the bottom of the tower 1 at approximately 70° C., to return phosphoric acid to the top of the tower at approximately 55° C., and to discharge the uncondensed gases and unabsorbed phosphorus pentoxide from the outlet 14 at approximately 75° C., although other suitable operating temperatures may be maintained. For economy of operation it is desirable to maintain a high rate of phosphorus combustion in the tower 1 and to regulate the acid flow and temperature conditions accordingly, but if the rate of phosphorus burning is reduced, the cooling requirements are correspondingly reduced.

By the use of a film of water 24 flowing along the outside walls of the tower 1, the temperature of the phosphoric acid inside the tower may be kept lower than otherwise at a minimum cost. While the temperature of the recirculating phosphoric acid could be lowered by the use of larger heat exchangers or by circulating more acid, this would entail larger heat exchangers or more power consumption and substantially increase the cost over that involved in flowing cooling water 24 along the outside walls of the tower 1.

The partial pressure of water vapor over 75% phosphoric acid is such that without simultaneous cooling of the phosphoric acid the temperature of the acid would be in the range of 110 to 120° C. At this temperature phosphoric acid is corrosive to stainless steel. The upper limit of temperature at which stainless steel may be used in contact with 75% phosphoric acid is considered to be 75 to 80° C. and by simultaneously cooling the walls of the tower by water flowing on the outside thereof, the temperature of the walls and of the phosphoric acid flowing on the inside thereof is maintained below that at which corrosion of stainless steel by 75% phosphoric acid is encountered.

The use of a stainless steel tower 1 provides substantial advantages over the use of graphite or refractory lined combustion towers. With a graphite combustion tower it is necessary that the tower be slowly cooled and slowly re-heated when for any reason it is necessary to temporarily suspend operation of the tower for the purpose of cleaning, repair or otherwise. With a stainless steel tower there is no necessity for a slow cooling or a slow period of re-heating as the production of phosphoric acid can be discontinued and resumed at will by merely providing for suitable flow of phosphoric acid along the inside of the tower 1 and suitable flow of cooling water on the outside of the tower 1 before the burning of the phosphorus is begun. In addition to the greater economy of a stainless steel tower over a graphite or refractory tower, maintenance problems are simplified inasmuch as the tower 1 is substantially self-discharging both with reference to the phosphoric acid produced and the uncondensed gases and unabsorbed phosphorus pentoxide, and there is little occasion to suspend operation of the furnace for the purpose of cleaning residues or deposits from the walls or base of the tower.

In place of the packed tower 16 for the removal of unabsorbed phosphorus pentoxide or phosphoric acid mist from the gases removed from the tower 1, an electrostatic precipitator or any suitable scrubber in which water or phosphoric acid contacts the gases may be provided to remove entrained phosphoric acid mist and any remaining residual phosphorus pentoxide from the gases discharged from the combustion chamber 1. The phosphorus burner 2 may also be located in the bottom of tower 1 and the outlet 14 for the steam and uncondensed gases located near the top of the tower 1.

Various other modifications and changes may be made from the preferred practice and embodiment of apparatus illustrated without departing from the spirit of this invention or the scope of the appended claims.

I claim:

1. The method of producing phosphoric acid of at least 75% strength from elemental phosphorus, which consists essentially of burning phosphorus in a thin-walled, unlined, stainless steel tower to produce phosphorus pentoxide in vapor phase inside said tower, introducing an aqueous phosphoric acid solution of approximately 75% strength into said tower and flowing said acid in a thin film along the inner walls of said tower covering the walls of said tower from the top to the bottom thereof, introducing water into said tower, vaporizing water in said tower from the water introduced into said tower and from the film of phosphoric acid along the walls of said tower, and hydrating and absorbing said phosphorus pentoxide vapors into the flowing phosphoric acid film on the walls of said tower while flowing water along the outside of said tower to provide additional heat transfer from the acid flowing along the inside walls of said tower and maintain the walls of said tower at a temperature of about 70 to 80° C. and below the temperature at which phosphoric acid of 75% strength corrodes stainless steel, removing the uncondensed gases from the tower at approximately 75° C. removing acid from the tower at approximately 70° C., and recirculating the acid along the inner walls of said tower.

2. The method of producing phosphoric acid which consists essentially of burning phosphorus to produce phosphorus pentoxide in vapor phase in an unlined, tower of corrosion resistant metal maintained at a sufficiently low temperature to prevent corrosion of the walls of the tower, introducing an aqueous phosphoric acid solution of at least 75% strength along the inner walls of said tower covering the walls of the tower from top to bottom thereof with a flowing film of said solution, introducing water into said tower, vaporizing water in said tower and hydrating and absorbing the phosphorus pentoxide vapors into the flowing phosphoric acid solution along the walls of said tower, flowing water along the outside walls of said tower to provide additional heat transfer from the acid inside said tower and maintain the walls of said tower at a temperature of about 70 to 80° C. and below the temperature at which phosphoric acid of at least 75% strength corrodes said tower, removing the uncondensed gases from the tower at approximately 75° C. removing the acid from the tower at approximately 70° C., cooling the acid outside the tower to approximately 55° C., recirculating the acid along the inner walls of said tower, and diluting said acid to maintain the recirculating acid at least 75% strength.

3. The method of producing phosphoric acid which consists essentially of burning phosphorus to produce phosphorus pentoxide in vapor phase in a vertical, unlined, tower of corrosion resistant metal maintained at a sufficiently low temperature to prevent corrosion of the walls of the tower, flowing an aqueous solution of phosphoric acid of approximately 75% strength along the inner walls of the tower covering the walls of the tower from top to bottom thereof with said solution, evaporating water from said solution and hydrating and absorbing the phosphorus pentoxide vapors into the flowing phosphoric acid solution, flowing water along the outside walls of said tower and maintaining the phosphoric acid solution inside the walls of said tower at about 70 to 80° C., collecting phosphoric acid solution in a pool in the bottom of the tower, removing the acid from the pool, cooling the acid outside the tower and recirculating the acid along the inner walls of said tower, removing unabsorbed phosphorus pentoxide and the gases from the tower near to but above the pool in the base of the tower at a temperature of approximately 75° C., and recovering additional phosphoric acid from the said removed gases.

4. The method of producing phosphoric acid which consists essentially of burning phosphorus to produce phosphorus pentoxide in vapor phase adjacent the top of an unlined, stainless steel tower, flowing phosphoric acid of at least 75% strength along the inner walls of the tower and covering the walls of the tower from the top to the bottom thereof with said phosphoric acid, vaporizing the water within the tower and hydrating and absorbing the phosphorus pentoxide vapors into the flowing phosphoric acid within the tower, removing the acid from the tower adjacent the bottom of the tower, cooling and recirculating the acid along the inner walls of said tower, flowing cooling water along the outside walls of the tower to cool the phosphoric acid solution inside the tower and maintain the walls of the tower at a temperature of approximately 70 to 80° C. and below the temperature at which said phosphoric acid corrodes stainless steel, removing acid from the tower at approximately 70° C., cooling the acid outside the tower and recirculating the acid along the inner walls of the tower and diluting said acid to maintain the recirculating acid at at least 75% strength and removing the unabsorbed and uncondensed gases from said tower at a temperature of approximately 75° C.

5. In a furnace for the production of phosphoric acid from elemental phosphorus, a vertical, unlined, stainless steel combustion chamber having an outlet for uncondensed gases adjacent the bottom thereof, a dome at the top of said chamber, means to spray water on said dome, a dam around said dome adapted to maintain a pool of water adjacent the edge of said dome, a burner in said chamber passing through said dome, means to burn phosphorus in said burner, means to introduce air into said chamber through said dome and adjacent to said burner, means to introduce phosphoric acid into the top of said chamber below said dome, means to distribute a film of said phosphoric acid along the inside walls of said chamber and to cover the walls of said chamber with said acid from top to bottom thereof, means to introduce additional phosphoric acid along the walls of said chamber, means to introduce water into said chamber adjacent said dome and to spray said water on the underside of said dome, means to maintain a pool of phosphoric acid in the bottom of said chamber, means to remove phosphoric acid from the bottom of said chamber, means to cool and recirculate said phosphoric acid to the top of said chamber, means to flow cooling water along the outside walls of said chamber, means to remove uncondensed gases from said chamber above the pool of phosphoric acid in the bottom of said chamber and through said outlet, means to recover additional phosphorus pentoxide from said removed gases, means to add water to said acid in said pool and maintain the phosphoric acid at approximately 75% concentration in said chamber, said means cooperating to maintain the temperature of the walls of said chamber at approximately 70° to 80° C. and below the temperature at which phosphoric acid corrodes stainless steel.

References Cited in the file of this patent

UNITED STATES PATENTS

| | | |
|---|---|---|
| 1,593,514 | Suchy | July 20, 1926 |
| 2,169,589 | Malowan | Aug. 15, 1939 |
| 2,266,328 | McCullough | Dec. 16, 1941 |
| 2,303,318 | Baskerville | Dec. 1, 1942 |
| 2,327,039 | Heath | Aug. 17, 1943 |
| 2,532,322 | McFarlin | Dec. 5, 1950 |

OTHER REFERENCES

Hartford and Copson, "Corrosion of Metals," Industrial and Engineering Chemistry, vol. 31, No. 9, September 1939. Pages 11-23—1128.

Weber, "Phosphoric Acid Imposes Severe Corrosive Burden," Chemical and Metallurgical Engineering," pages 542-545, October 1932, vol. 39, No. 10.

Rohrman, "Corrosion of Metals by Phosphoric Acid," Chem. and Met. Eng., vol. 42, No. 7, 1935, pages 368, 369.

Striplin Development of Process and Equipment of Production of Phosphoric Acid. T. V. A. Chem. Eng. Rept. #2, 1948. Abstract in Chem. Abstracts, page 7649e, vol. 43, Oct.–Nov. 1949.

Almond and Steinlliss, "Phosphorus Combustion System," Chem. Eng., Oct. 1948, pages 105-109.